(12) United States Patent
Kobayashi

(10) Patent No.: US 10,121,067 B2
(45) Date of Patent: Nov. 6, 2018

(54) IMAGE PROCESSING APPARATUS THAT DETERMINES PROCESSING TARGET AREA OF AN IMAGE BASED ON DEGREE OF SALIENCY, IMAGE PROCESSING METHOD, AND STORAGE MEDIUM

(71) Applicant: CANON KABUSHIKI KAISHA, Tokyo (JP)

(72) Inventor: Satoru Kobayashi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 457 days.

(21) Appl. No.: 14/850,599

(22) Filed: Sep. 10, 2015

(65) Prior Publication Data

US 2016/0093064 A1    Mar. 31, 2016

(30) Foreign Application Priority Data

Sep. 30, 2014   (JP) .................................. 2014-202121

(51) Int. Cl.
*G06K 9/00*    (2006.01)
*G02B 7/36*    (2006.01)
(Continued)

(52) U.S. Cl.
CPC ........... *G06K 9/00362* (2013.01); *G02B 7/36* (2013.01); *G06K 9/3233* (2013.01);
(Continued)

(58) Field of Classification Search
None
See application file for complete search history.

(56) References Cited

U.S. PATENT DOCUMENTS 5,854,860 A    12/1998  Kobayashi
6,282,317 B1    8/2001  Luo et al. ..................... 382/203
(Continued)

FOREIGN PATENT DOCUMENTS

JP    2000-207564    7/2000
JP    2001-167282    6/2001
(Continued)

OTHER PUBLICATIONS

JP Office Action dated Sep. 18, 2018 in counterpart JP Application No. 2014-202121 with English translation.

*Primary Examiner* — Matthew Bella
*Assistant Examiner* — Brian Shin
(74) *Attorney, Agent, or Firm* — Fitzpatrick, Cella, Harper & Scinto

(57) ABSTRACT

An image processing apparatus is provided with a spatial information calculation unit for calculating spatial information of a subject, which is the information of an area in which the subject in an image is predicted to be present, a first area setting unit for setting a first area in the image based on the spatial information, a second area setting unit for setting a second area outside the first area, a first feature amount calculation unit for calculating a first feature amount of the first area, a second feature amount calculation unit for calculating a second feature amount of the second area, the second feature amount being a feature amount of the same type as the first feature amount, and an saliency calculation unit for calculating a degree of visual saliency of the subject.

18 Claims, 15 Drawing Sheets

(51) Int. Cl.
    *H04N 5/235*    (2006.01)
    *H04N 5/232*    (2006.01)
    *G06K 9/32*      (2006.01)
    *G06K 9/46*      (2006.01)

(52) U.S. Cl.
    CPC ....... *H04N 5/2351* (2013.01); *H04N 5/23212* (2013.01); *G06K 9/4676* (2013.01)

(56) References Cited

U.S. PATENT DOCUMENTS

| | | | |
|---|---|---|---|
| 7,634,135 B2 | 12/2009 | Fukui et al. | 383/173 |
| 9,014,467 B2 | 4/2015 | Hu et al. | G06T 7/0081 |
| 2003/0235341 A1* | 12/2003 | Gokturk | G06K 9/00228 |
| | | | 382/243 |
| 2008/0304740 A1 | 12/2008 | Sun et al. | 383/168 |
| 2010/0329550 A1* | 12/2010 | Cheatle | G06T 11/60 |
| | | | 382/165 |
| 2012/0275701 A1* | 11/2012 | Park | G06K 9/4671 |
| | | | 382/173 |
| 2012/0288189 A1* | 11/2012 | Hu | G06K 9/4671 |
| | | | 382/164 |
| 2014/0254922 A1* | 9/2014 | Wang | G06K 9/4671 |
| | | | 382/159 |

FOREIGN PATENT DOCUMENTS

| | | |
|---|---|---|
| JP | 2006-133990 | 5/2006 |
| JP | 2009-055272 | 3/2009 |
| JP | 2012-123631 A | 6/2012 |
| JP | 2012-243313 | 12/2012 |
| JP | 2013-012124 | 1/2013 |
| JP | 2014-022826 | 2/2014 |

* cited by examiner

IMAGE DATA

FOCUS AREA INFORMATION
(AF SENSOR PHASE DIFFERENCE AF)

FOCUS AREA INFORMATION
(IMAGE CAPTURING PLANE PHASE DIFFERENCE AF)

AREA INFORMATION (AF SENSOR PHASE DIFFERENCE AF)

MULTIPLE PIECES OF SUBJECT INNER AREA INFORMATION

SUBJECT INNER AREA AND SUBJECT OUTER AREA

DEGREE OF VISUAL SALIENCY

DEGREE OF VISUAL SALIENCY

IMAGE DATA 1 (Nth Frame)

IMAGE DATA 2 (N+1th Frame)

MOVING AREA INFORMATION

SUBJECT INNER AREA AND SUBJECT OUTER AREA

DEGREE OF VISUAL SALIENCY

IMAGE DATA

FACE AREA INFORMATION

SUBJECT INNER AREA AND SUBJECT OUTER AREA

DEGREE OF VISUAL SALIENCY

IMAGE PROCESSING APPARATUS THAT DETERMINES PROCESSING TARGET AREA OF AN IMAGE BASED ON DEGREE OF SALIENCY, IMAGE PROCESSING METHOD, AND STORAGE MEDIUM

BACKGROUND OF THE INVENTION

Field of the Invention

The present invention relates to a technique for detecting a visually conspicuous area in a captured image.

Description of the Related Art

In recent years, a technique for detecting, among subjects that are present in an image, a subject that is likely to be conspicuous to human vision has been proposed. For example, in Japanese Patent Laid-Open No. 2012-123631, a visually salient area is detected based on a difference in feature amount between a training data extraction area with a small radius and a verification data extraction area with a large radius. That is, it is determined that the larger the difference in feature amount between the training data extraction area and the verification data extraction area surrounding the training data extraction area is, the higher the degree of visual saliency (hereinafter, referred to as the degree of visual saliency) is.

In the above-described Japanese Patent Laid-Open No. 2012-123631, the sizes of the training data extraction area and the verification data extraction area are determined based on learning data of a subject, and the degree of visual saliency at an arbitrary point in the screen is calculated. However, there is a problem in that the sizes of the training data extraction area and the verification data extraction area cannot be determined in the case of a subject whose learning data does not exist, and the accuracy of the degree of visual saliency deteriorates. There is also a problem in that, for example, if a plurality of areas with different sizes are set and degrees of visual saliency at arbitrary points are calculated, the processing amount will be huge.

SUMMARY OF THE INVENTION

The present invention has been made in light of the above-described problems, so that a highly accurate degree of visual saliency is calculated and an area of interest is detected with a small processing amount.

According to the first of the present invention, there is provided an image processing apparatus comprising: a spatial information calculation unit configured to calculate spatial information of a subject, the spatial information being information of an area in which the subject in an image is predicted to be present; a first area setting unit configured to set a first area in the image based on the spatial information; a second area setting unit configured to set a second area outside the first area; a first feature amount calculation unit configured to calculate a first feature amount of the first area; a second feature amount calculation unit configured to calculate a second feature amount of the second area, the second feature amount being a feature amount of the same type as the first feature amount; and an saliency calculation unit configured to calculate a degree of visual saliency of the subject based on a difference between the first feature amount and the second feature amount.

According to the second aspect of the present invention, there is provided an image processing method comprising: calculating spatial information of a subject, the spatial information being information of an area in which a subject in an image is predicted to be present; setting a first area in the image based on the spatial information; setting a second area outside the first area; calculating a first feature amount of the first area; calculating a second feature amount of the second area, the second feature amount being a feature amount of the same type as the first feature amount; and calculating a degree of visual saliency of the subject based on a difference between the first feature amount and the second feature amount.

Further features of the present invention will become apparent from the following description of exemplary embodiments with reference to the attached drawings.

DESCRIPTION OF THE EMBODIMENTS

Embodiments of the present invention will be described below in detail with reference to the attached drawings.

First Embodiment

Figure 1:
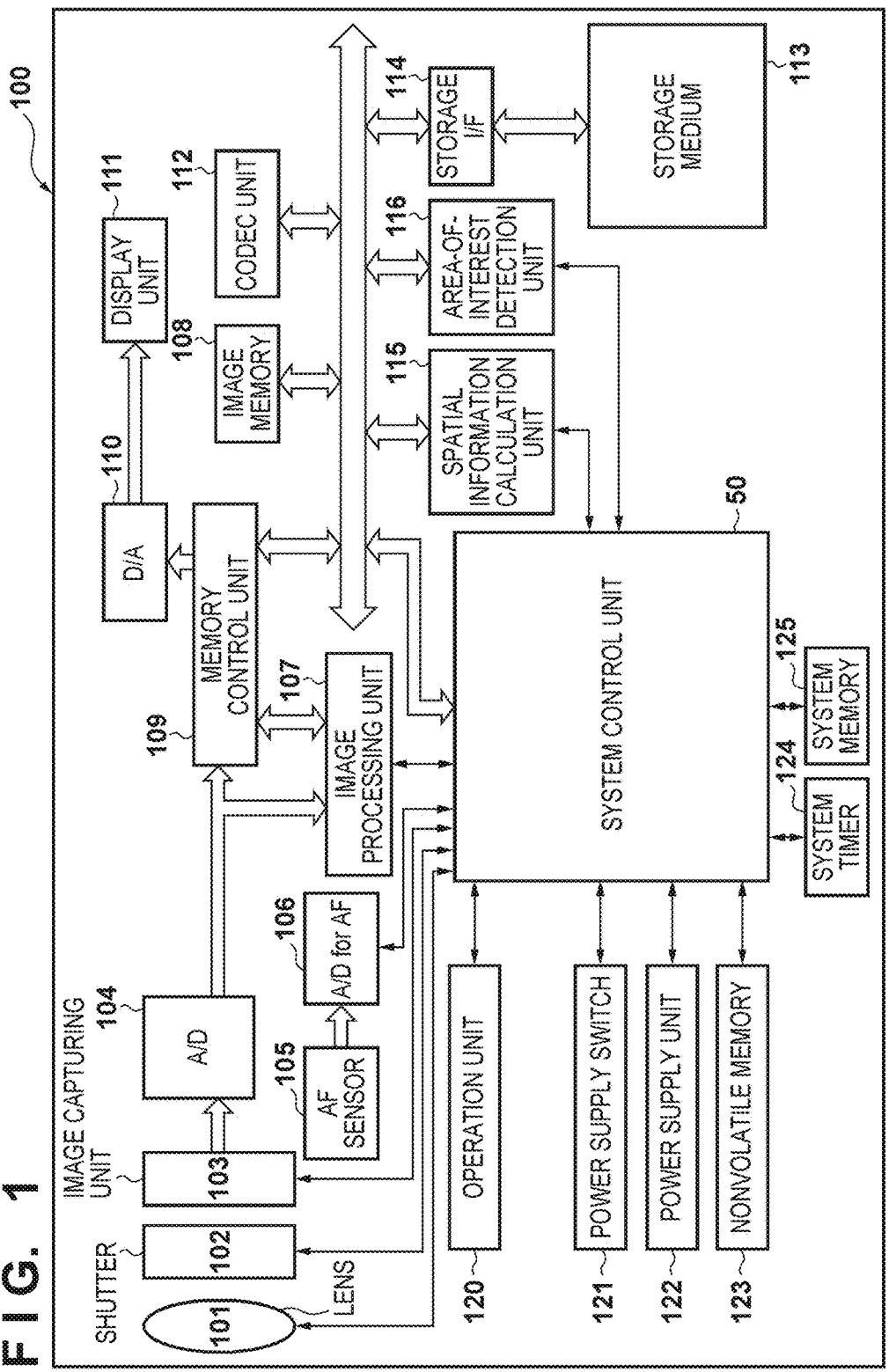
FIG. 1 is a block diagram showing the configuration of a first embodiment in which an image processing apparatus according to the present invention is applied to an image capturing apparatus.

FIG. 1 is a block diagram showing the configuration of the first embodiment in which the image processing apparatus according to the present invention is applied to an image capturing apparatus. An image capturing apparatus 100 in the present embodiment detects an area of interest based on spatial information of a subject determined in accordance with focus area information. The configuration of the image capturing apparatus of the present embodiment will be described below with reference to FIG. 1.

In FIG. 1, reference numeral 101 indicates a lens group including a zoom lens and a focusing lens, reference numeral 102 indicates a shutter provided with a diaphragm function, and reference numeral 103 indicates an image capturing unit constituted by a CCD, a CMOS element, or the like that converts an optical image into an electrical signal. Reference numeral 104 indicates an A/D converter that converts an analog signal output by the image capturing unit 103 into a digital signal, and reference numeral 105 indicates an AF sensor constituted by a CCD, a CMOS element, or the like that converts an optical image into an electrical signal for AF control. Reference numeral 106 indicates an AF A/D converter that converts an analog signal output by the AF sensor 105 into a digital signal. Reference numeral 107 indicates an image processing unit that performs various types of image processing such as white balance processing or γ processing, on image data output from the A/D converter 104. Reference numeral 108 indicates an image memory, reference numeral 109 indicates a memory control unit that controls the image memory 108, reference numeral 110 indicates a D/A converter that converts an input digital signal into an analog signal, reference numeral 111 indicates a display unit such as an LCD, and reference numeral 112 indicates a codec unit that performs compression coding and decoding of the image data.

Reference numeral 113 indicates a storage medium such as a memory card or a hard disk that stores the image data. Reference numeral 114 indicates a storage I/F, which is an interface to the storage medium 113. Reference numeral 115 indicates a spatial information calculation unit that calculates the spatial information indicating the position or the size of a subject that is present in the image data. Reference numeral 116 indicates an area-of-interest detection unit that detects the area of interest in the image data.

Reference numeral 50 indicates a system control unit for controlling the overall system of the image capturing apparatus 100. Reference numeral 120 indicates an operation unit for inputting various types of operation instructions from a user, reference numeral 121 indicates a power supply switch, and reference numeral 122 indicates a power supply unit. Reference numeral 123 indicates an electrically erasable and recordable nonvolatile memory, for which an EEPROM or the like is used, for example. Reference numeral 124 indicates a system timer for measuring time used for various types of control or the time of an integrated clock, and reference numeral 125 indicates a system memory in which constants and variables for the operations of the system control unit 50, a program read out from the nonvolatile memory 123, and the like are expanded.

Next, a flow of basic processing during shooting in the image capturing apparatus 100 configured as described above will be described. The image capturing unit 103 photoelectrically converts light that is incident thereon via the lens 101 and the shutter 102, and output the converted light as an input image signal to the A/D converter 104. The A/D converter 104 converts an analog image signal output from the image capturing unit 103 into a digital image signal, and outputs the digital image signal to the image processing unit 107. The AF sensor 105 receives, using multiple pairs of line sensors, light that is incident via the lens 101 and the shutter 102, and outputs the light to the AF A/D converter 106. The AF A/D converter 106 converts an analog signal output from the AF sensor 105 into a digital signal, and outputs the digital signal to the system control unit 50. The system control unit 50 detects, based on the image signal output by a pair of the line sensors, a relative position shift amount from a subject in the splitting direction of a luminous flux, and performs so-called phase difference AF control.

The image processing unit 107 performs various types of image processing such as white balance processing or γ processing on the image data from the A/D converter 104 or image data read out from the memory control unit 109. The image data output from the image processing unit 107 is written into the image memory 108 via the memory control unit 109. Moreover, the image processing unit 107 performs predetermined computing processing using the image data captured by the image capturing unit 103, and the system control unit 50 performs exposure control or focus adjusting control based on the obtained computing result. Accordingly, AE (automatic exposure) processing, AF (autofocus) processing, and the like are performed.

The image memory 108 stores the image data output from the image capturing unit 103 and image data to be displayed on the display unit 111. Moreover, the D/A converter 110 converts the data for image display stored in the image memory 108 into an analog signal and supplies the analog signal to the display unit 111. The display unit 111 performs display on a display device such as an LCD in accordance with the analog signal from the D/A converter 110. The codec unit 112 performs compression coding on the image data stored in the image memory 108 based on a standard such as JPEG or MPEG.

The spatial information calculation unit 115 calculates the spatial information indicating the position or the size of a subject present in an image. Then, based on the spatial information from the spatial information calculation unit 115, the area-of-interest detection unit 116 detects the area of interest in which the subject in the image data is predicted to be present, and outputs area-of-interest information to the system control unit 50. The system control unit 50 determines, based on the area-of-interest information, an area (target area for processing) in which predetermined processing is preferentially performed. The predetermined processing includes performing the AF control so that the subject belonging to the area of interest is in focus in the case where multiple subjects are present in the image data, for example. The predetermined processing also includes performing the AF control so that the subject belonging to the area of interest has proper brightness in the case where multiple subjects are present in the image data. The spatial information calculation unit 115 and the area-of-interest detection unit 116 will be described later.

Besides the above-described basic operations, the system control unit 50 executes a program stored in the above-described nonvolatile memory 123 so as to realize the processing of the present embodiment, which will be described later. The program herein refers to a program for executing various flowcharts that will be described later in the present embodiment. At this time, constants and variables for the operations of the system control unit 50, the program read out from the nonvolatile memory 123, and the like are expanded in the system memory 125. The above has described the configuration and the basic operations of the image capturing apparatus 100.

Next, the spatial information calculation unit 115 and the area-of-interest detection unit 116 will be described in detail. First, the spatial information calculation unit 115 will be described in detail with reference to FIG. 2, FIG. 3 and FIGS. 4A to 4C.

Figure 2:
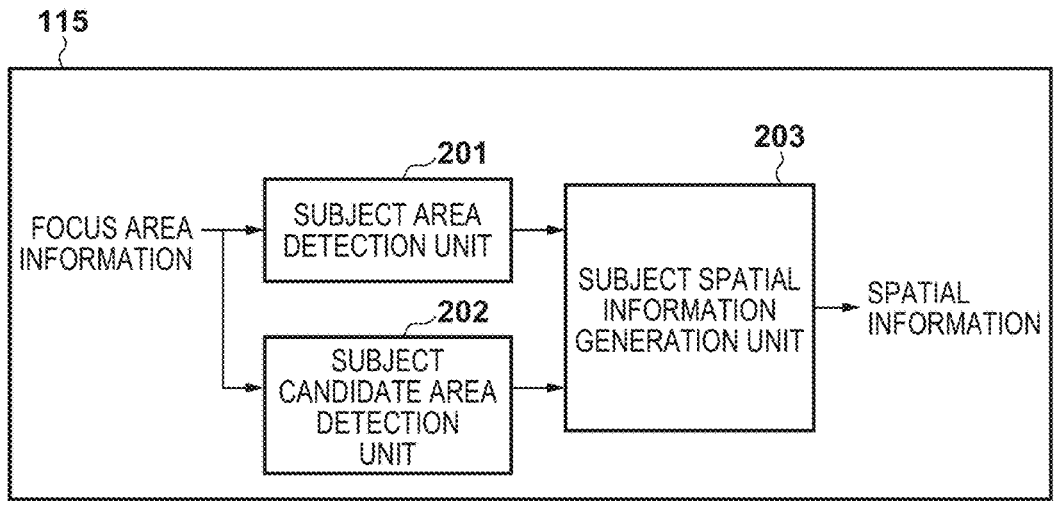
FIG. 2 is a diagram showing the configuration of a spatial information calculation unit in a first embodiment.

FIG. 2 is a diagram showing the configuration of the spatial information calculation unit 115 in the present embodiment. The spatial information calculation unit 115 is constituted by a subject area detection unit 201, a subject candidate area detection unit 202, and a subject spatial information generation unit 203.

Figure 3:
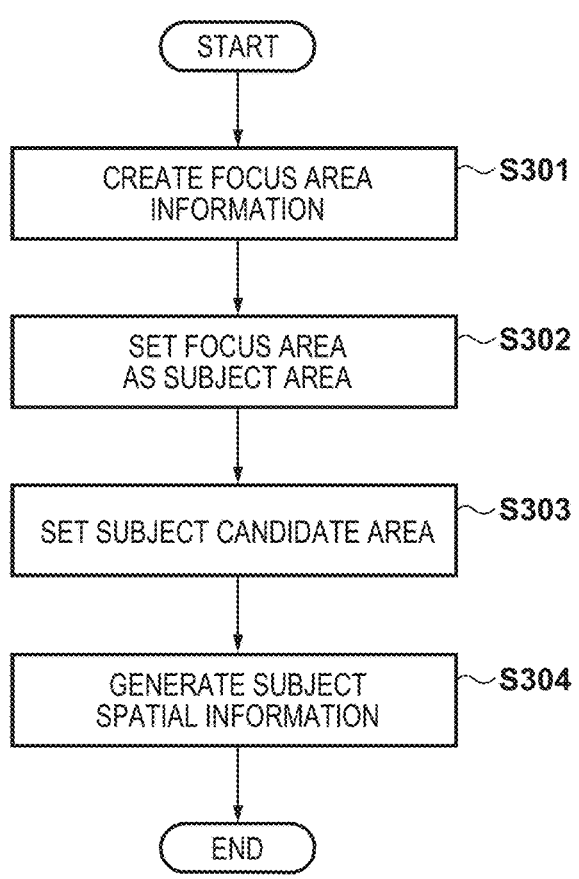
FIG. 3 is a flowchart showing the processing of the spatial information calculation unit in the first embodiment.

FIG. 3 is a flowchart showing the processing of the spatial information calculation unit 115. The operations of the spatial information calculation unit 115 will be described below with reference to the flowchart in FIG. 3.

Figure 4A:
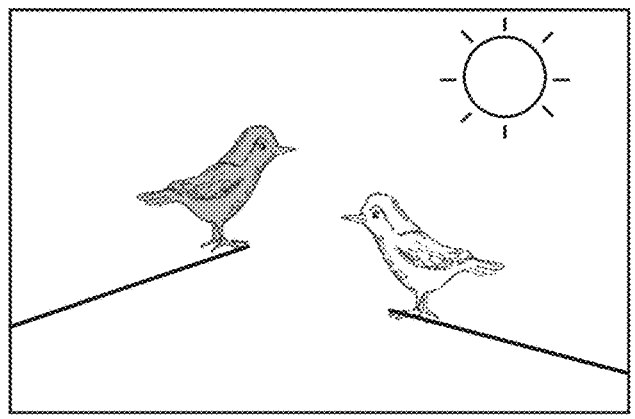
FIGS. 4A to 4C are diagrams showing focus area information.
Figure 4B:
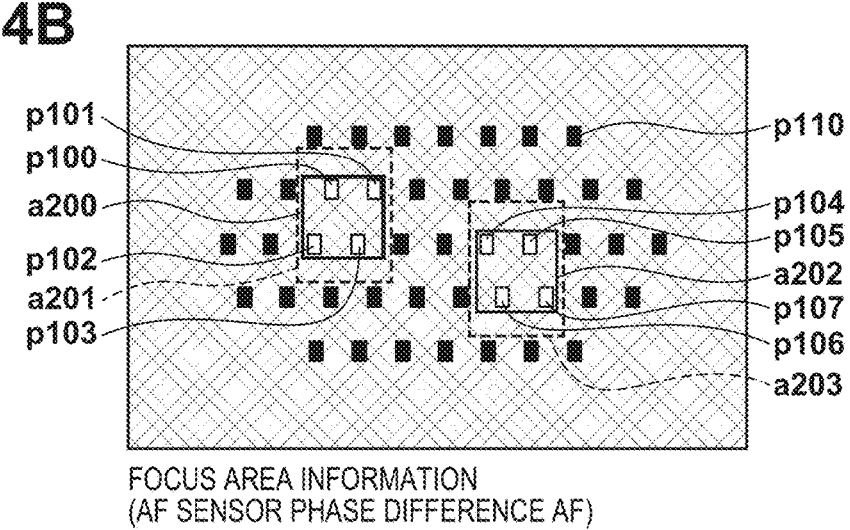
Figure 4C:
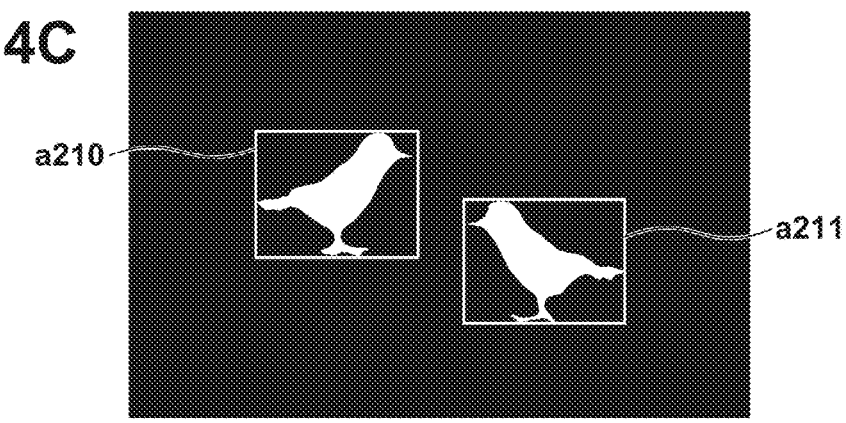

In step S301, the system control unit 50 outputs, to the subject area detection unit 201, the information of a focus area in which a difference of phase is smaller than a predetermined value during the phase difference AF control (during focusing operation) (focus information calculation). Examples of the focus area information are shown in FIGS. 4A to 4C. FIG. 4A shows the image data captured by the image capturing unit 103, and FIG. 4B and FIG. 4C show the focus area information created by the system control unit 50.

FIG. 4B shows the focus area information created by the system control unit 50 based on the output signal of the AF sensor 105. In FIG. 4B, a rectangle such as p100 or p110 indicates a single ranging point in the AF sensor 105, and it is indicated that a blackened ranging point such as p110 is a non-focus point in which the phase difference is greater than or equal to the predetermined value and a whitened ranging point such as p100 is a focus point in which the phase difference is smaller than the predetermined value. That is, the example in FIG. 4B indicates that two birds in FIG. 4A are in focus.

In step S302, the subject area detection unit 201 sets the focus area as a subject area. Specifically, an area in which in-focus ranging points are grouped is set as a subject area. In FIG. 4B, in-focus points p100, p101, p102, and p103 are grouped and set as a subject area a200. Moreover, in-focus points p104, p105, p106, and p107 are grouped and set as a subject area a202.

In step S303, the subject area candidate detection unit 202 sets a subject candidate area. The subject candidate area refers to an area in which there is a possibility that a subject is present. If the ranging points are discrete as with the focus area information in FIG. 4B, for example, a boundary position between a bird and a background (sky) in FIG. 4A cannot be precisely detected. In view of this, as the area in which there is a possibility that the subject is present, an area extending to the non-focus ranging points that is present around the focus area is assumed to be the subject candidate area. That is, a subject candidate area corresponding to the subject area a200 is assumed to be a201, and a subject candidate area corresponding to the subject area a202 is assumed to be a203.

In step S304, the subject spatial information generation unit 203 converts subject area information calculated by the subject area detection unit 201 and subject candidate area information calculated by the subject candidate area detection unit 202 into coordinates corresponding to image data, and outputs the data as spatial information.

In the above description, the AF sensor 105 having discrete ranging points as in FIG. 4B was described as an example, but the system control unit 50 may calculate the focus area information using so-called image capturing plane phase difference AF in which AF control using a phase difference method is performed using a pixel output signal of the image capturing unit 103. In this case, the image capturing unit 103 is configured to divide pixels under a single micro lens and separately receive a portion of an exit pupil of a shooting optical system. By dividing the pixels under the micro lens in this manner for all the pixels of the image capturing unit 103, it is possible to calculate a phase difference for each pixel, and the focus area information with a high resolution can be obtained.

FIG. 4C is a diagram showing an area (focus area information) in which the phase difference, which has been calculated for each pixel using the above-described image capturing plane phase difference AF method, is smaller than the predetermined value. In FIG. 4C, a whitened area is the focus area, and blackened area is a non-focus area. As shown in the drawing, the focus area information calculated based on the image capturing plane phase difference AF method has a higher resolution compared with the focus area information calculated based on the phase difference AF of the AF sensor 105 in FIG. 4B, making it possible to capture the shape of the subject with high accuracy. In the case where a subject area can be detected with high accuracy in this manner, the subject area candidate detection unit 202 sets a subject candidate area as the same area as the subject area, and an area in which there is a possibility that a subject is present does not have to be separately detected.

Moreover, in the examples of FIG. 4B and FIG. 4C, the subject area detection unit 201 detects, as the subject area, an area surrounding the subject in the shape of a rectangle with respect to the focus area information, but detection of the subject area does not need to be in the shape of a rectangle. For example, the shape may be a circle or a triangle, and the shape of the focus area itself in which the phase difference is smaller than the predetermined value may be the subject area. That is, in the example of FIG. 4C, the focus area (whitened area in the shape of a bird) in an area a210 and the focus area (whitened area in the shape of a bird) in an area a211 may be the subject areas. The above has described spatial information calculation unit 115.

Next, the area-of-interest detection unit 116 will be described in detail with reference to FIG. 5, FIG. 6, FIGS. 7A and 7B and FIGS. 8A to 8C. The area-of-interest detection unit 116 detects an area of interest in the image data based on the spatial information calculated by the spatial information calculation unit 115.

Figure 5:
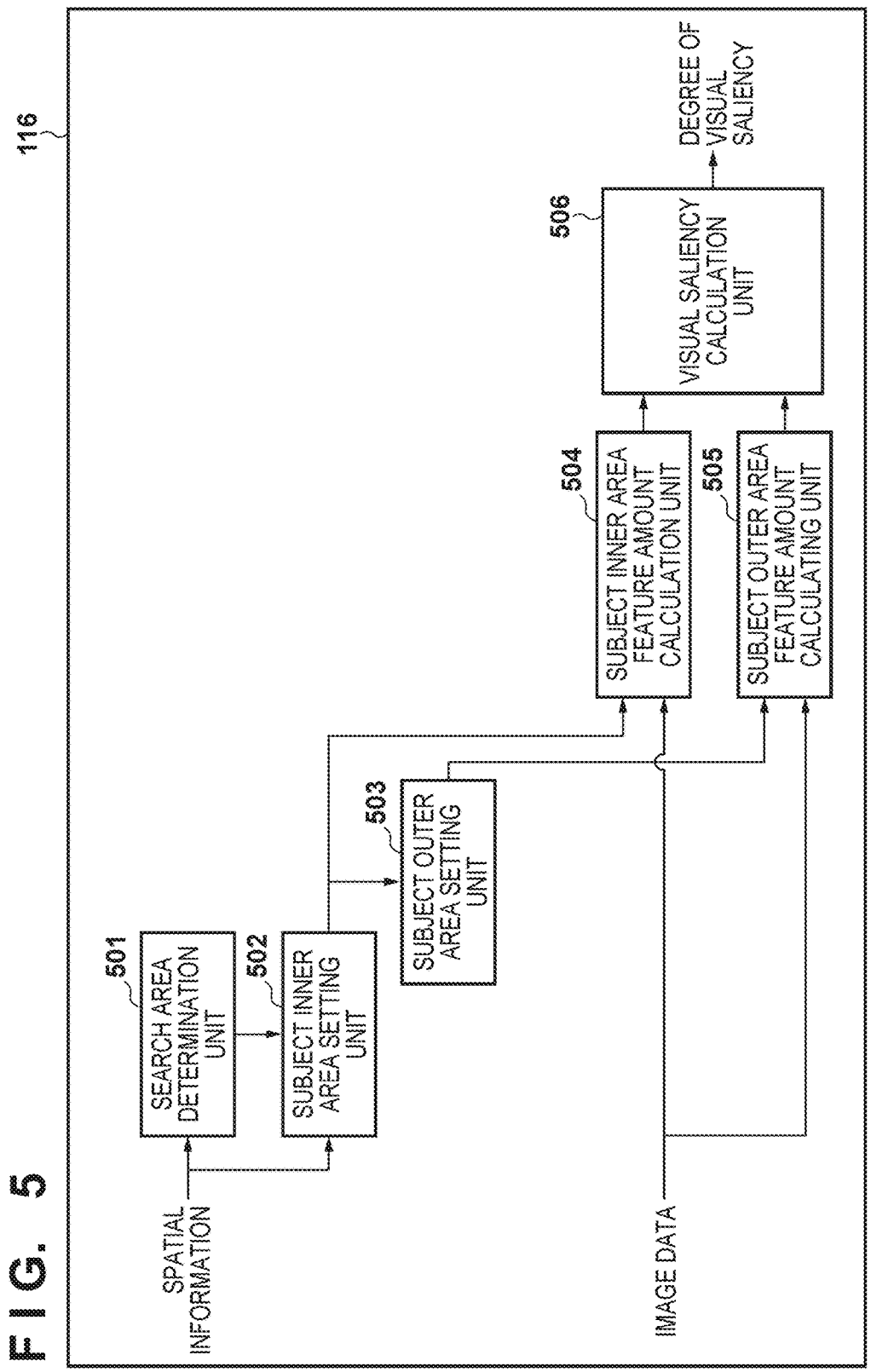
FIG. 5 is a diagram showing the configuration of an area-of-interest detection unit in the first embodiment.

FIG. 5 is a diagram showing the configuration of the area-of-interest detection unit 116. The area-of-interest detection unit 116 is configured by including a search area determination unit 501, a subject inner area setting unit 502, a subject outer area setting unit 503, a subject inner area feature amount calculation unit 504, a subject outer area feature amount calculating unit 505 and a visual saliency calculation unit 506.

Figure 6:
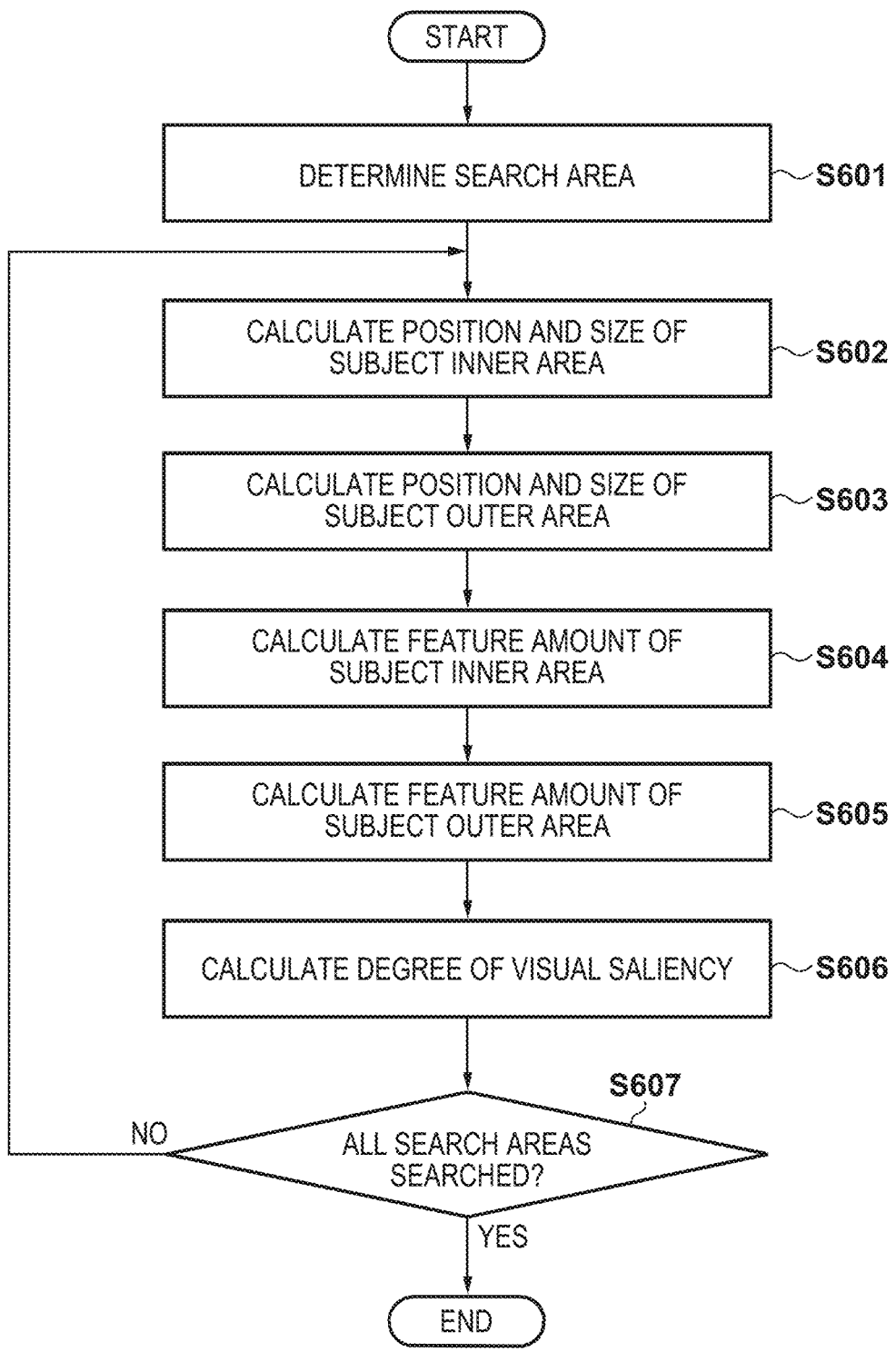
FIG. 6 is a flowchart showing the processing of the area-of-interest detection unit in the first embodiment.

FIG. 6 is a flowchart showing the processing of the area-of-interest detection unit 116. The operations of the area-of-interest detection unit 116 will be described below with reference to the flowchart in FIG. 6.

Figure 7A:
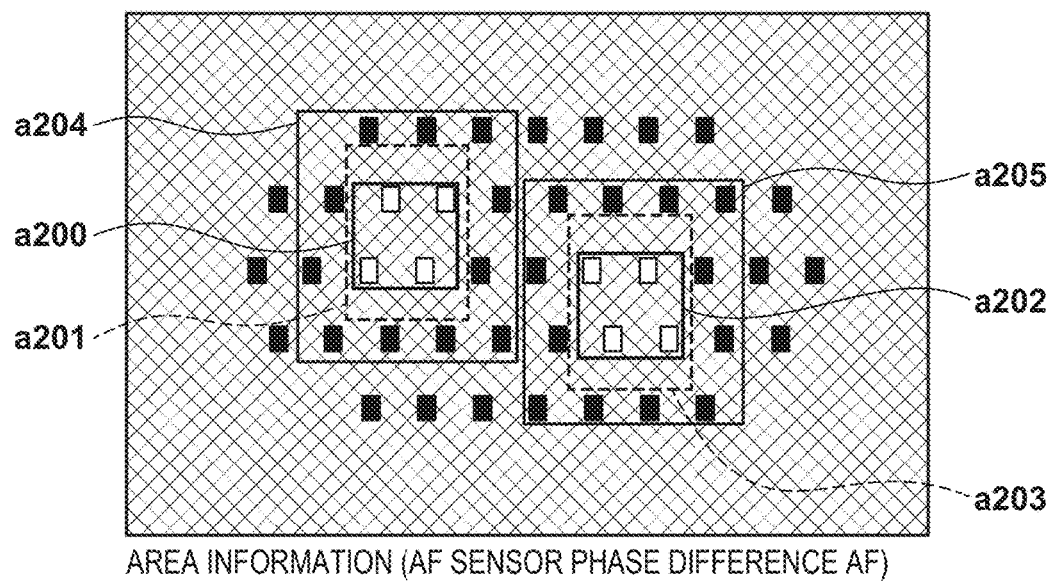
FIGS. 7A and 7B are diagrams for describing area information.

In step S601, the search area determination unit 501 determines a search area for calculating a degree of visual saliency based on the subject candidate area contained in the spatial information calculated by the spatial information calculation unit 115. FIG. 7A shows an example of determining a specific search area. In FIG. 7A, as described with reference to FIG. 4, the subject candidate areas are the areas a201 and a203. The search area determination unit 501 determines these subject candidate areas a201 and a203 as the search areas. Note that in the case where the subject candidate area information is not contained in the spatial information, it is determined that the subject area is a search area.

In step S602, the subject inner area setting unit 502 sets, based on the subject area information contained in the spatial information calculated by the spatial information calculation unit 115 and the search area determined by the search area determination unit 501, a subject inner area for calculating the degree of visual saliency. A specific example of setting the subject inner area is shown in FIG. 7A. In FIG. 7A, as described with reference to FIGS. 4A to 4C, the subject areas are a200 and a202. The subject inner area setting unit 502 sets these subject areas a200 and a202 as the subject inner areas.

Figure 7B:
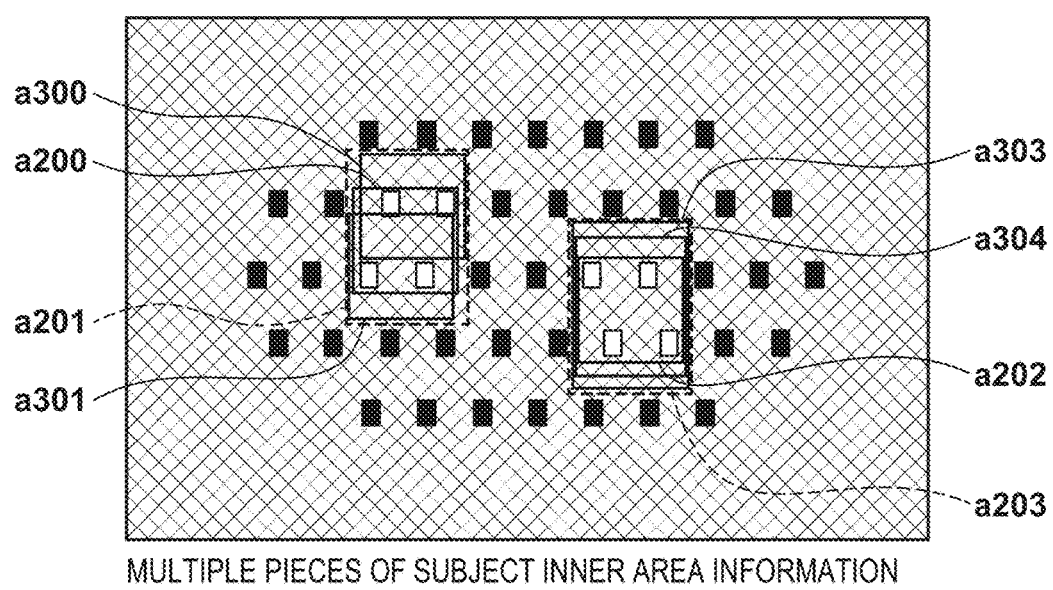

Moreover, the position of the subject area may be shifted in horizontal and perpendicular directions in the search area for each predetermined pixel without changing the size of the subject area, so that multiple subject inner areas are set, as with a200, a300 and a301 in FIG. 7B, for example. Moreover, the size of the subject area may be increased in the search area for each predetermined pixel without changing the position of the subject area, so that multiple subject inner areas may be set, as with a202, a303 and a304 in FIG. 7B, for example. By performing the above described operations, the degree of visual saliency, which will be described later, can be calculated for an area in which there is a possibility that the subject is present and for the size of a subject.

In step S603, the subject outer area setting unit 503 sets, based on the subject inner area set by the subject inner area setting unit 502, a subject outer area outside the subject inner area in order to calculate the degree of visual saliency. A specific example of setting the subject outer area is shown in FIG. 7A. In FIG. 7A, for example, the subject inner area is a200. First, the subject outer area setting unit 503 sets an area a204 that is centered on this subject inner area a200 and is larger than the subject inner area a200, and sets, as the subject outer area, the remaining area a204 excluding the subject inner area a200. The size of the area a204 is a predetermined number of times the length of a side or the area measurement of the subject inner area a200, for example. Moreover, the subject outer area may be set to an area without a focus point, for example. Moreover, in the case where the shape of the subject inner area is circular or triangular, the shape of the subject outer area may also be circular or triangular. Note that in the case where the subject inner area setting unit 502 sets multiple subject inner areas, the subject outer area setting unit 503 sets a subject outer area for each of the subject inner areas.

Figure 8A:
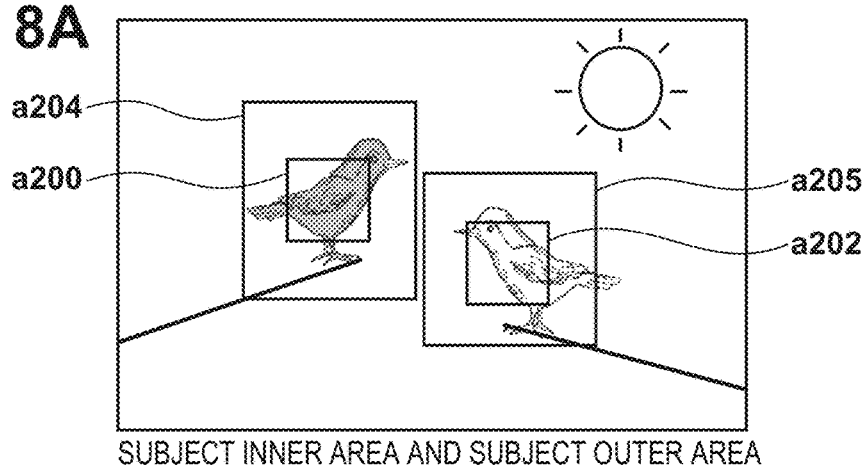
FIGS. 8A to 8C are diagrams for describing degrees of visual saliency in the first embodiment.

In step S604, the subject inner area feature amount calculation unit 504 calculates a feature amount of the image data in the subject inner area set by the subject inner area setting unit 502. FIG. 8A shows a subject inner area for which the feature amount is to be calculated. In FIG. 8A, as described with reference to FIGS. 7A and 7B, the subject inner areas set by the subject inner area setting unit 502 are a200 and a202. Therefore, the subject inner area feature amount calculation unit 504 calculates the feature amounts of these two areas.

In step S605, the subject outer area feature amount calculating unit 505 calculates a feature amount of the image data in the subject outer area set by the subject outer area setting unit 503. FIG. 8A shows subject outer areas for which the feature amount is to be calculated. In FIG. 8A, as described with reference to FIGS. 7A and 7B, the subject outer areas set by the subject outer area setting unit 503 are the remaining area a204 excluding the area a200 and a remaining area a205 excluding the area a202. Therefore, the subject outer area feature amount calculating unit 505 calculates the feature amounts of these two areas.

Here, the feature amounts calculated by the subject inner area feature amount calculation unit 504 and the subject outer area feature amount calculating unit 505 are feature amounts of the same type including at least one of brightness, color, edge intensity, a brightness histogram, a color histogram and an edge intensity histogram in the area.

In step S606, the visual saliency calculation unit 506 calculates the degree of visual saliency based on the difference between the subject inner area feature amount calculated by the subject inner area feature amount calculation unit 504 and the subject outer area feature amount calculated by the subject outer area feature amount calculating unit 505. Specifically, the absolute difference of the feature amounts is evaluated so as to calculate the degree of visual saliency. For example, in the case where the feature amount involves brightness, the absolute difference between the luminance average value of the subject inner area and the luminance average value of the subject outer area serves as the degree of visual saliency. That is, in the example of FIG. 8A, the absolute difference between the luminance average value of, mainly, a black bird in the subject inner area a200 and the luminance average value of, mainly, the sky in the subject outer area serves as the degree of visual saliency. Moreover, the absolute difference between the luminance average value of, mainly, a white bird in the subject inner area a202 and the luminance average value of, mainly, the sky in the subject outer area serves as the degree of visual saliency.

Figure 8B:
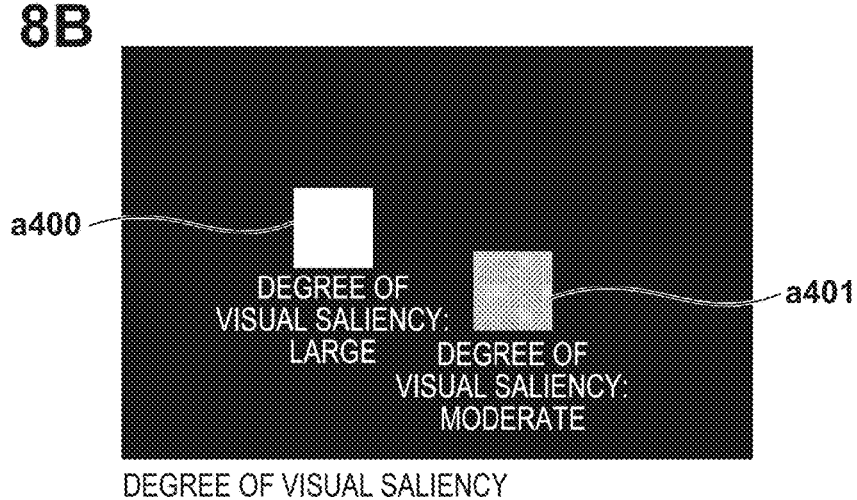
Figure 8C:
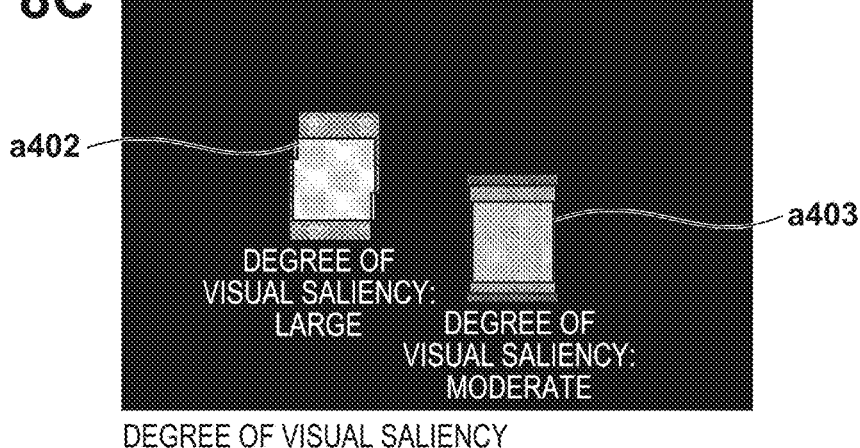

FIG. 8B is a diagram showing the degrees of visual saliency, in which the degree of visual saliency corresponding to the subject inner area a200 (black bird) is indicated by an area a400, and the degree of visual saliency corresponding to the subject inner area a202 (white bird) is indicated by an area a401. Moreover, FIG. 8B shows that the whiter the area is, the larger the degree of visual saliency is, and the blacker the area is, the smaller the degree of visual saliency is.

Regarding the degrees of visual saliency of the subject inner area a200 (black bird) and the subject inner area a202 (white bird) calculated by the above-described method, because the absolute difference of average luminance of the black bird and the sky is larger than that of the white bird and the sky, the degree of visual saliency of the black bird is higher than that of the white bird as in FIG. 8B. If the size of the subject outer area corresponding to the subject inner area a200 is too large or too small compared with the actual subject (black bird), the absolute difference between the average luminance of the subject inner area and the subject outer area will be small, and therefore, the degree of visual saliency cannot be appropriately calculated. Therefore, a subject inner area suitable for the position or the size of an actual subject needs to be set.

Moreover, for example, in the case where the feature amount involves a brightness histogram, the absolute difference per each bin between the luminance histogram of the subject inner area and the luminance histogram of the subject outer area is calculated, and the integrated value thereof serves as the degree of visual saliency.

Moreover, the visual saliency calculation unit 506 calculates the degrees of visual saliency for multiple subject inner areas and subject outer areas set in the subject candidate area. In the case where the multiple subject inner areas are overlapped as in the example of FIG. 8C, the degree of visual saliency of the overlapped subject inner areas is the average value of the multiple degrees of visual saliency calculated for the overlapped subject inner areas. Moreover, the maximum degree of visual saliency among the multiple degrees of visual saliency calculated for the overlapped subject inner areas may serve as the degree of visual saliency.

In step S607, in the case where the search for all of the search areas determined in step S601 is not finished, the processing of step S602 and onward is repeated.

Note that the visual saliency calculation unit 506 does not need to calculate the degree of visual saliency in the case where the size of the subject inner area is smaller than a predetermined value. Moreover, in the case where the subject inner area is spaced away from the center of a screen by a distance that is greater than or equal to a predetermined distance (positioned at the end of the screen), the visual saliency calculation unit 506 does not need to calculate the degree of visual saliency. This is because the subject is less likely to be given attention in the case where the size of the subject is small or in the case where the subject is positioned at the end of the screen. The above has described the area-of-interest detection unit 116.

Because the degree of visual saliency calculated in this manner involves a visually conspicuous area of interest, the degree of visual saliency is used for priority setting for various processes. Examples of such processes include performing the AF control preferentially on this area of interest.

For example, in the case where multiple in-focus subjects move, the system control unit 50 performs the AF control based on the information of the phase difference calculated for the AF control and the information of the area of interest detected by the area-of-interest detection unit 116, so that the subject corresponding to the area of interest is preferentially in focus. Specifically, in the examples of FIGS. 8A to 8C, in the case where the black bird and the white bird move at the same time, the AF control is performed with priority given so that the black bird having the larger degree of visual saliency is in focus. By performing the AF control preferentially on the area of interest in this manner, it is possible to cause the attention subject (area of interest) to be in focus without blurring the attention subject (area of interest).

Note that, in the above description, the subject area detection unit 201 sets the subject area based on the area in which the phase difference is smaller than the predetermined value (focus area information), but a method of setting a subject area is not limited thereto. For example, the system control unit 50 outputs information on multiple areas such as an area in which the phase difference is in a first range (front focus state), an area in which the phase difference is in a second range (focus state), and an area in which the phase difference is in a third range (rear focus state). Then, the subject area detection unit 201 may calculate the subject area information based on each piece of area information.

The area-of-interest detection unit 116 detects an area of interest based on this subject area information. If the area-of-interest detection unit 116 detects a subject area in the front focus state as the area of interest, the system control unit 50 performs the AF control so that this non-focus subject area is preferentially in focus. It is possible to focus on a non-focus area of interest by performing the AF control as described above.

Second Embodiment

The image capturing apparatus 100 in accordance with the second embodiment of the present invention detects an area of interest based on the spatial information of a subject determined in accordance with moving area information (moving body information). The second embodiment will be described below. Note that components with the same reference signs as those in the first embodiment perform operations and processing similar to those of the first embodiment, and therefore description thereof is omitted.

The second embodiment is different from the first embodiment in the configuration and the operations of the spatial information calculation unit in FIG. 1. Because other configurations and operations are the same as those of the first embodiment, description thereof is omitted. The spatial information calculation unit 115 in the second embodiment will be described in detail with reference to FIG. 9, FIG. 10 and FIGS. 11A to 11C.

Figure 9:
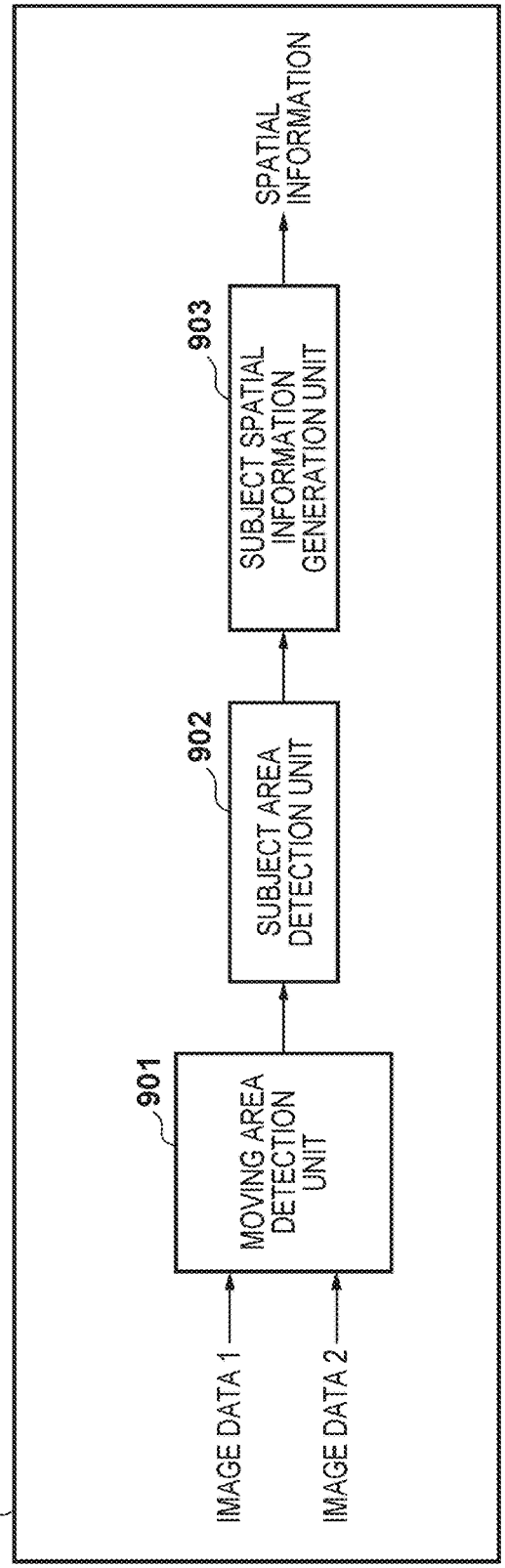
FIG. 9 is a diagram showing the configuration of a spatial information calculation unit in a second embodiment.

FIG. 9 is a diagram showing the configuration of the spatial information calculation unit 115 in the second embodiment. The spatial information calculation unit 115 is configured by including a moving area detection unit 901, a subject area detection unit 902, and a subject spatial information generation unit 903.

Figure 10:
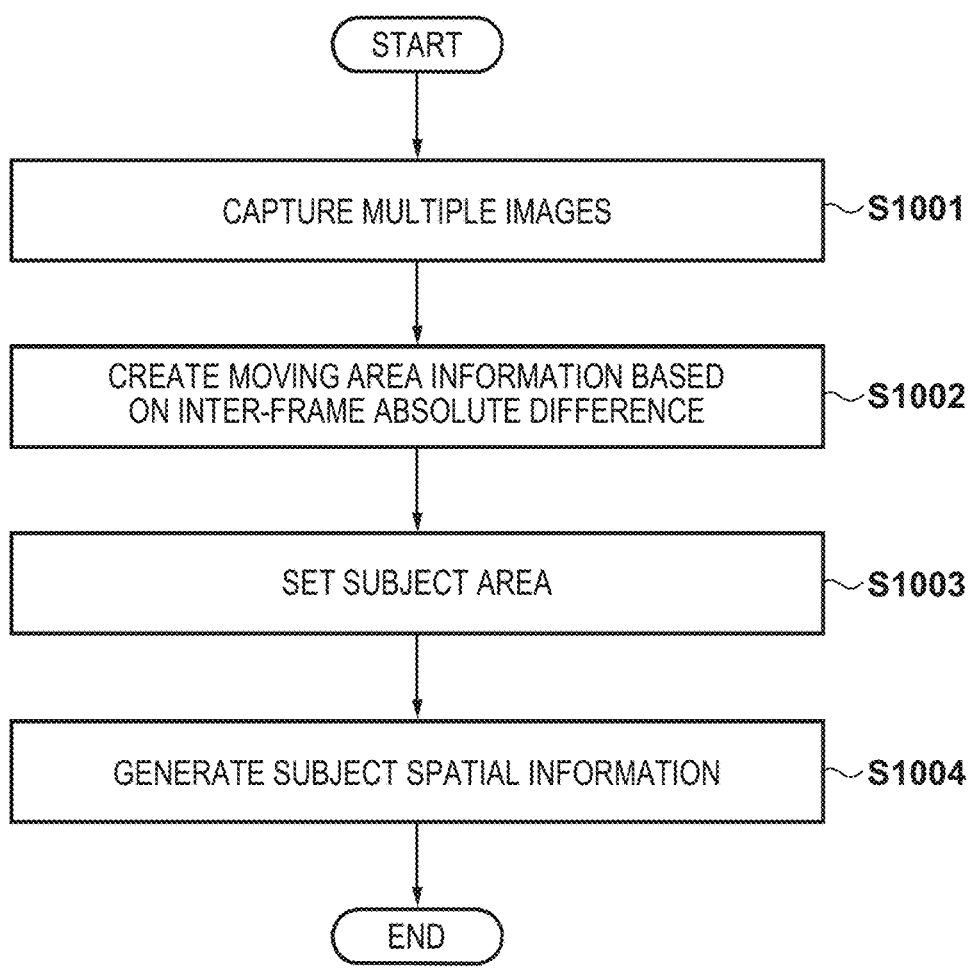
FIG. 10 is a flowchart showing the processing of the spatial information calculation unit in the second embodiment.

FIG. 10 is a flowchart showing the processing of the spatial information calculation unit 115 in the second embodiment. The operations of the spatial information calculation unit 115 will be described below with reference to the flowchart in FIG. 10.

Figure 11A:
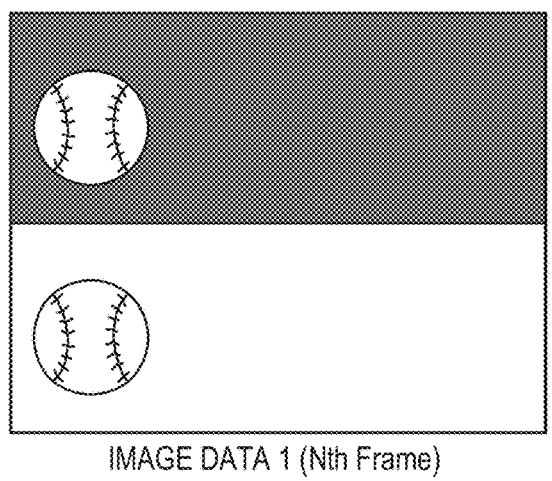
FIGS. 11A to 11C are diagrams showing moving area information.
Figure 11B:
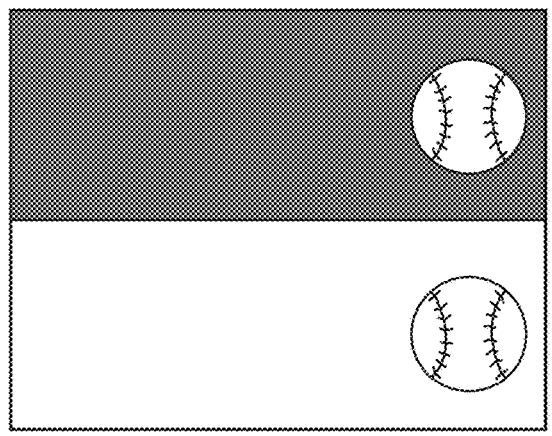
Figure 11C:
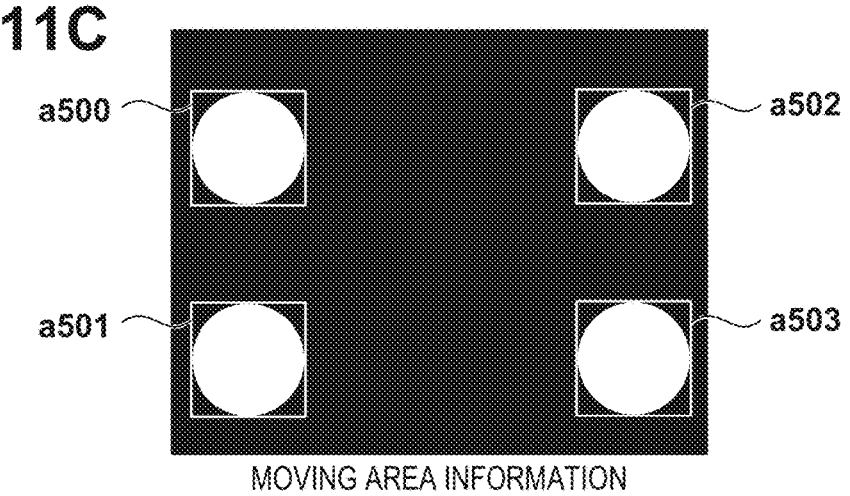

In step S1001, the image capturing unit 103 captures at least two images at different times as in FIG. 11A and FIG. 11B. FIG. 11A shows image data 1 of an Nth frame, and FIG. 11B shows image data 2 of an N+1th frame. In FIGS. 11A to 11C, an example of capturing a moving baseball is shown, and because the image data 1 and the image data 2 were captured at different times, the moving subject (baseball) is present at different positions.

In step S1002, the moving area detection unit (moving body information calculation unit) 901 calculates an inter-frame absolute difference for each pixel between the two (multiple) images captured in step S1001. Moving area information in which an area with a large inter-frame absolute difference serves as a moving area is then created as in FIG. 11C. In FIG. 11C, the moving area with the large inter-frame absolute difference is whitened. The position or the size of the subject can be understood by referring to such moving area information.

In step S1003, the subject area detection unit 902 sets the moving area as a subject area. Specifically, as in FIG. 11C, subject areas a500, a501, a502, and a503 are set so as to surround the respective moving areas.

In step S1004, the subject spatial information generation unit 903 outputs, as the spatial information, subject area information calculated by the subject area detection unit 902.

The above has described the spatial information calculation unit 115 in the second embodiment. The area-of-interest detection unit 116 of the present embodiment has a configuration and operations similar to those of the first embodiment, and therefore detailed description thereof is omitted.

Figure 12A:
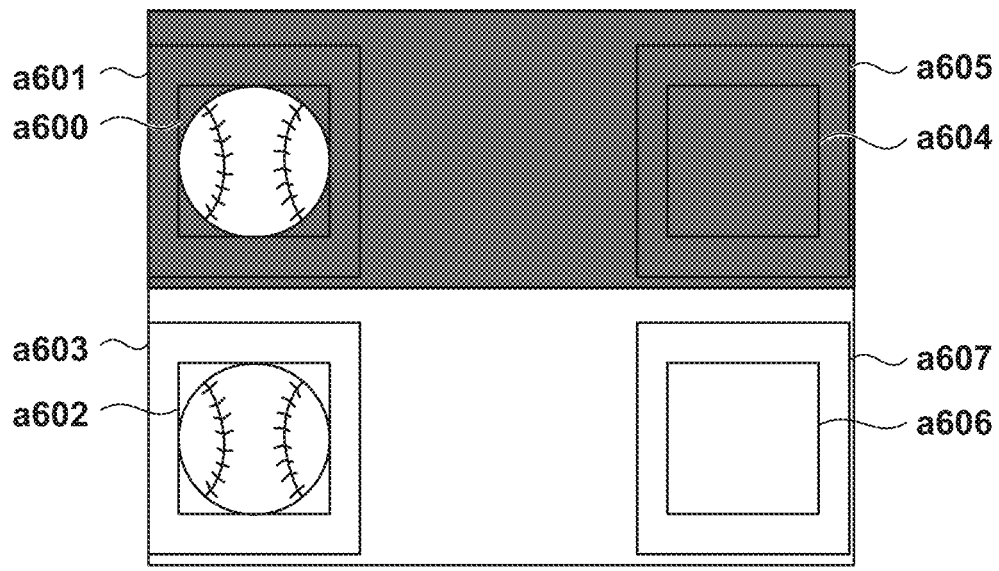
FIGS. 12A and 12B are diagrams for describing degrees of visual saliency in the second embodiment.
Figure 12B:
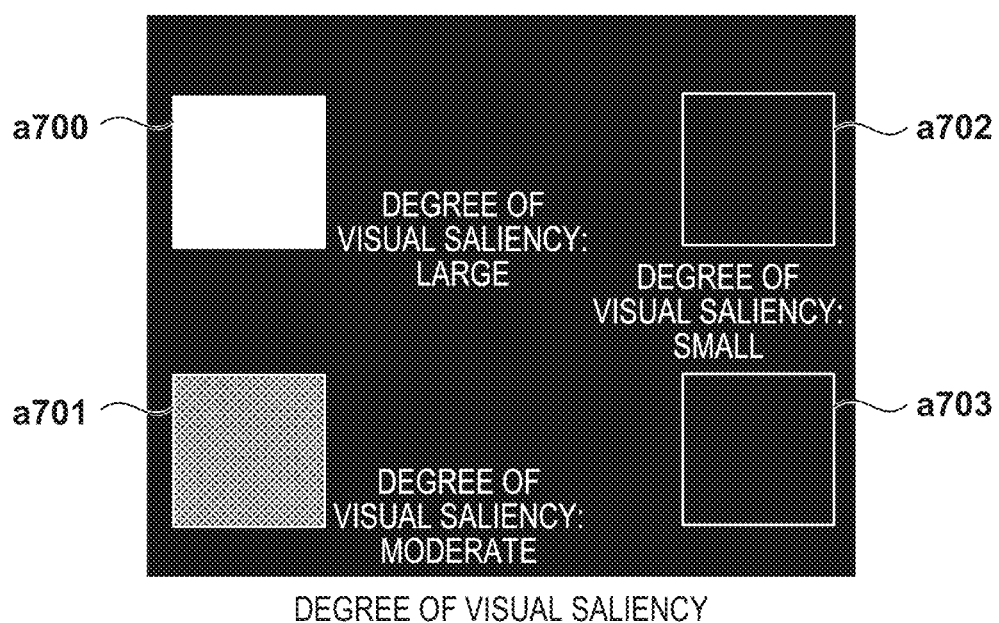

FIGS. 12A and 12B are diagrams for describing the degree of visual saliency calculated by the area-of-interest detection unit 116 in the second embodiment. The area-of-interest detection unit 116 in the second embodiment has the same configuration and performs the same operations as the first embodiment, so that subject inner areas and subject outer areas as in FIG. 12A are set based on the spatial information described with reference to FIGS. 11A to 11C.

Here, the subject inner areas are areas a600, a602, a604, and a606 in FIG. 12A. A subject outer area corresponding to the subject inner area a600 is an area a601 in FIG. 12A excluding a600. Similarly, subject outer areas corresponding to the subject inner areas a602, a604, and a606 are respectively areas a603, a605, and a607 excluding a602, a604, and a606.

The area-of-interest detection unit 116 then calculates the degree of visual saliency as in FIG. 12B based on the difference in feature amount between the subject inner area and the subject outer area. The degree of visual saliency of an area a700 will have a large value because the difference in feature amount between the subject inner area and the subject outer area is large. The degree of visual saliency of an area a701 will have a moderate value because the difference in feature amount between the subject inner area and the subject outer area is moderate. The degrees of visual saliency of an area a702 and an area a703 will have small values because the differences in feature amount between the subject inner areas and the subject outer areas are small.

Because the degree of visual saliency calculated in this manner involves a visually conspicuous area of interest, the degree of visual saliency is used for priority setting for various processes. Examples of such processes include performing the AF control preferentially on this area of interest.

For example, in the case where multiple moving bodies (baseballs) are present as in FIG. 12A, the system control unit 50 performs the AF control based on the information of a phase difference calculated for the AF control and the information of an area of interest detected by the area-of-interest detection unit 116, so that the subject corresponding to the area of interest is preferentially in focus. Specifically, in the examples of FIGS. 12A and 12B, the AF control is preferentially performed on, out of an upper baseball and a lower baseball, the upper baseball whose degree of visual saliency is larger. By performing the AF control preferentially on the area of interest in this manner, it is possible to cause the attention subject (area of interest) to be in focus without blurring the attention subject (area of interest).

Third Embodiment

The image capturing apparatus 100 according to the third embodiment of the present invention detects an area of interest based on spatial information of a subject determined in accordance with face area information. The third embodiment will be described below. Note that components with the same reference signs as those in the first and second embodiments perform operations and processing similar to those of the first and the second embodiments, and therefore description thereof is omitted.

The third embodiment is different from the first and second embodiments in the configuration and the operations of the spatial information calculation unit in FIG. 1. Other configurations and the operations are the same as those of the first embodiment, and therefore the description thereof is omitted. The spatial information calculation unit 115 in the third embodiment will be described in detail with reference to FIG. 13, FIG. 14 and FIGS. 15A and 15B.

Figure 13:
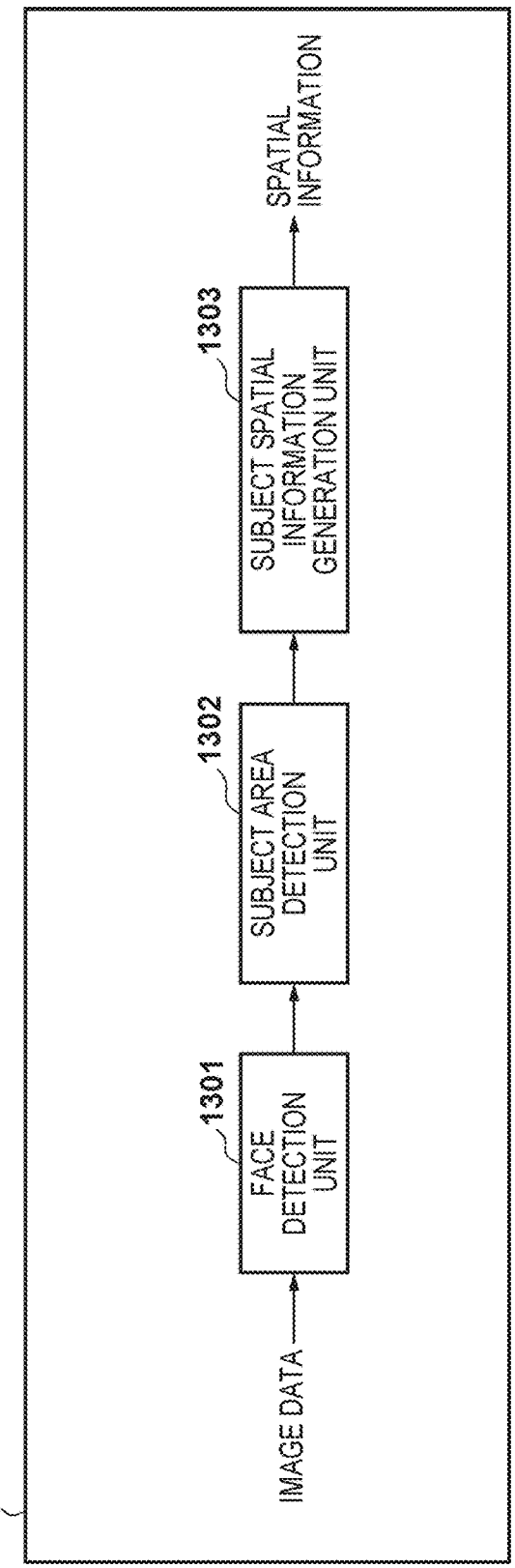
FIG. 13 is a diagram showing the configuration of a spatial information calculation unit in a third embodiment.

FIG. 13 is a diagram showing the configuration of the spatial information calculation unit 115 in the third embodiment. The spatial information calculation unit 115 is configured by including a face detection unit 1301, a subject area detection unit 1302, and a subject spatial information generation unit 1303.

Figure 14:
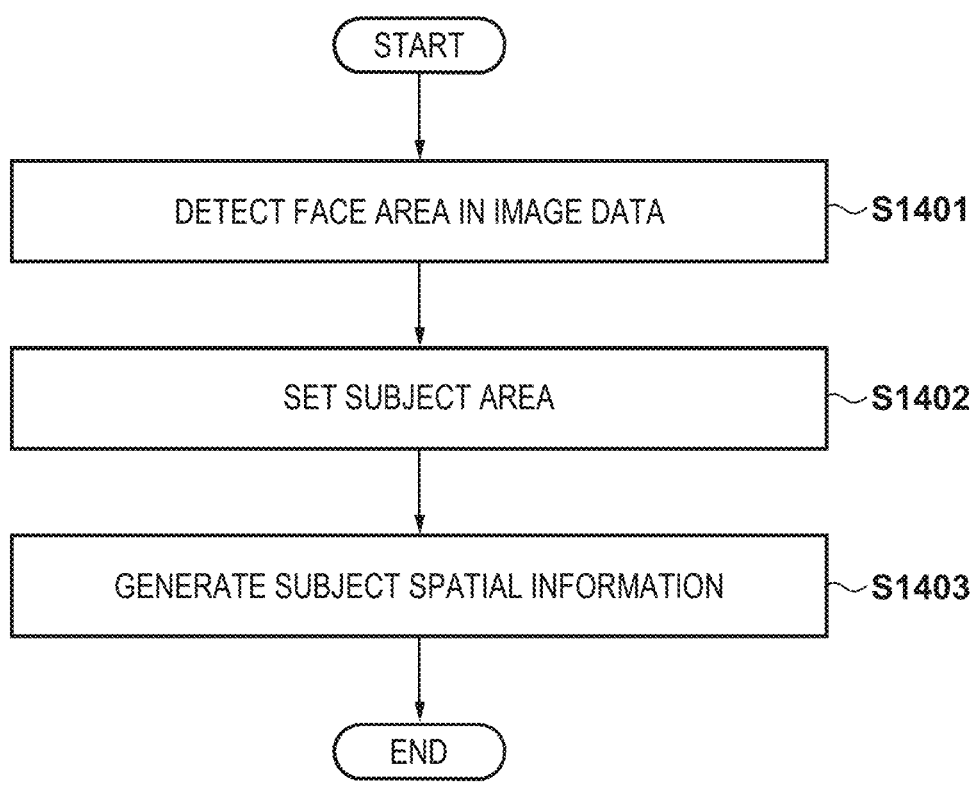
FIG. 14 is a flowchart showing the processing of the spatial information calculation unit in the third embodiment.

FIG. 14 is a flowchart showing the processing of the spatial information calculation unit 115 in the third embodiment. The operations of the spatial information calculation unit 115 in the third embodiment will be described below with reference to the flowchart in FIG. 14.

Figure 15A:
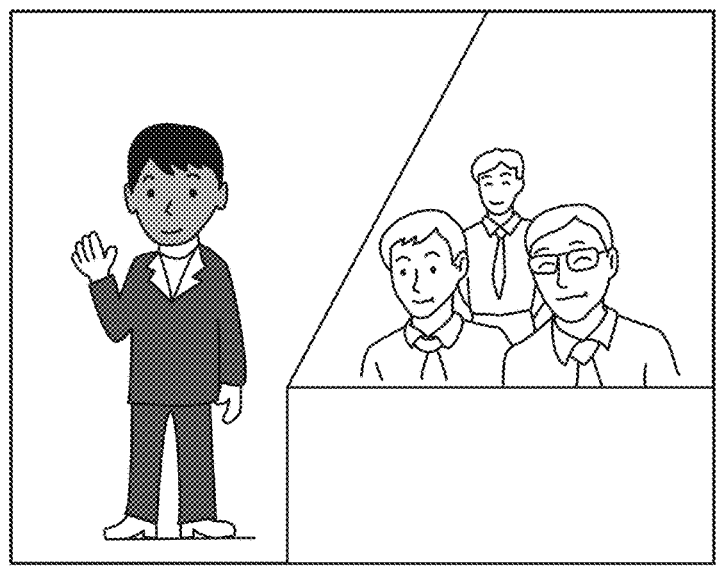
FIGS. 15A and 15B are diagrams showing face area information.
Figure 15B:
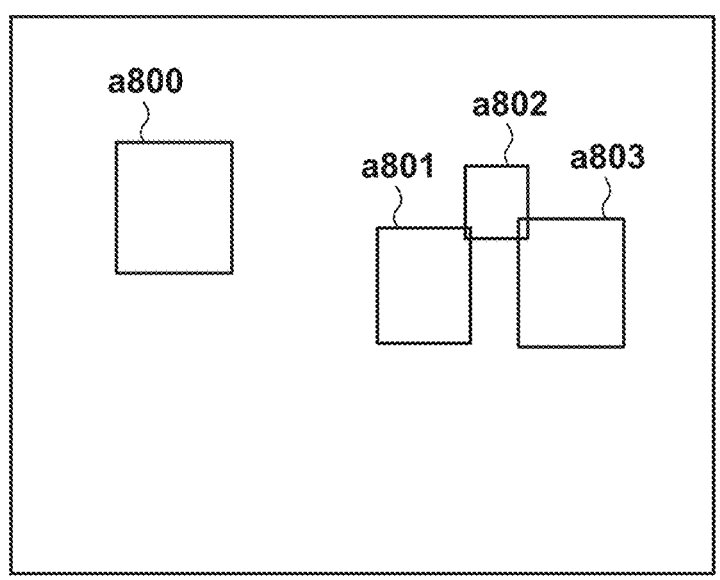

In step S1401, the face detection unit 1301 detects a face area that is present in image data, and outputs face area information (face detection information). The face detection unit 1301 will be described with reference to FIGS. 15A and 15B. Note that a known method such as an evaluation method of matching eyes and a nose with a learning pattern is used for detecting the face area, for example. The face detection unit 1301, in which image data as in FIG. 15A is input, detects a face area that is present in the image data, and outputs face area information as in FIG. 15B, for example. FIG. 15B showing the face area information corresponds to FIG. 15A showing the image data, and four face areas are individually a800, a801, a802, and a803. The face detection unit 1301 outputs such face area information to the subject area detection unit 1302.

In step S1402, the subject area detection unit 1302 sets the face area contained in the face area information as a subject area. In step S1403, the subject spatial information generation unit 1303 outputs subject area information calculated by the subject area detection unit 1302 as spatial information.

Note that the face detection unit 1301 may also output, as the face area information, the information of the direction of a face to the subject area detection unit 1302. The subject area detection unit 1302 then sets, based on the information of the input direction of the face, only a face facing front as a subject area, for example, and a face in profile does not need to be set as a subject area.

In the above description, an example for detecting a face area was described, but the present invention is not limited to detection of the face area. For example, a human body area may be detected in order to use human body detection information, and a general subject may be detected. That is, it is sufficient that an area of a subject is detected using a subject detection and recognition technique.

In the above description, an example of setting the face area as the subject area was described, but the subject area detection unit 1302 may set, as the subject area, an area encompassing the face area and the human body area.

Moreover, the subject area detection unit 1302 may set, as a subject inner area, an area that has the same phase difference as the face area based on phase difference information and face area information calculated during the AF control by the system control unit 50 described in the first embodiment. The above has described the spatial information calculation unit 115 according to the third embodiment. The area-of-interest detection unit 116 of the present embodiment has the same configuration and operations as those of the first and second embodiments, and therefore detailed description thereof is omitted.

Figure 16A:
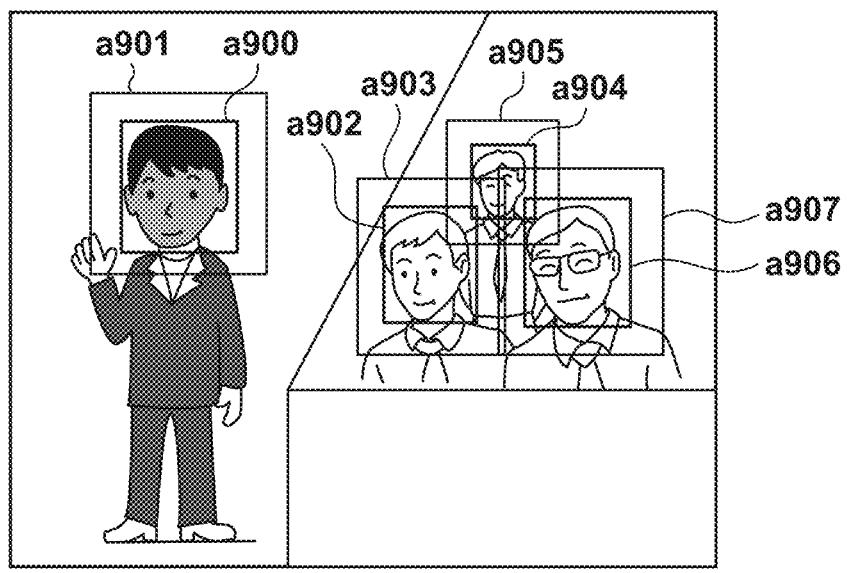
FIGS. 16A and 16B are diagrams for describing degrees of visual saliency in the third embodiment.
Figure 16B:
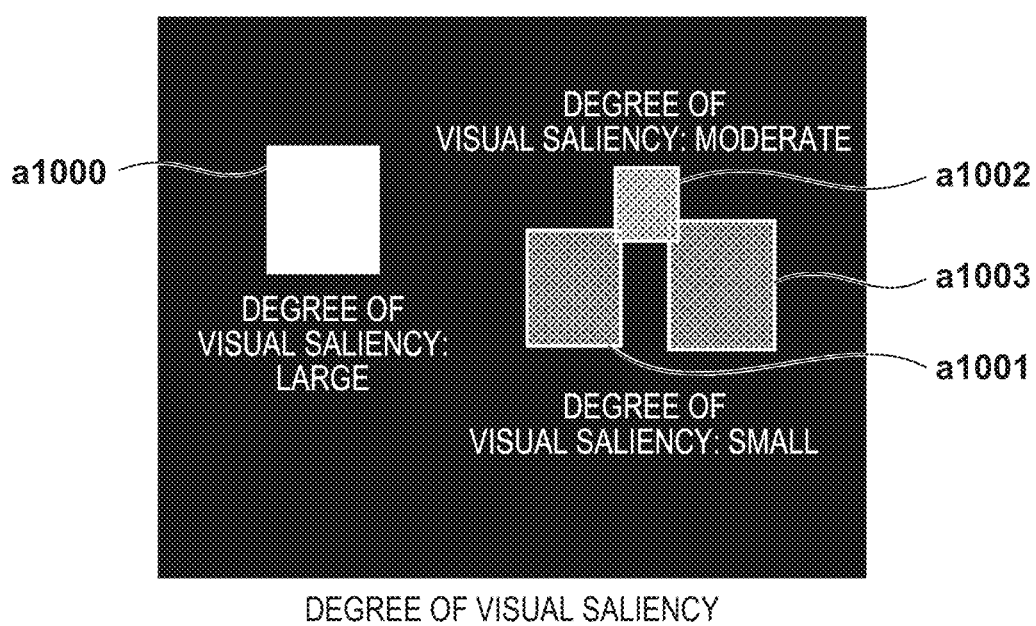

FIGS. 16A and 16B are diagrams for describing a degree of visual saliency calculated by the area-of-interest detection unit 116 in the third embodiment. The area-of-interest detection unit 116 in the third embodiment has the same configuration and performs the same operations as those of the first and the second embodiments, so that subject inner areas and subject outer areas are set as in FIG. 16A, based on the spatial information described with reference to FIGS. 15A and 15B. Here, the subject inner areas are a900, a902, a904, and a906 in FIG. 16A. A subject outer area corresponding to the subject inner area a900 is an area a901 in FIG. 16A excluding a900. Similarly, subject outer areas corresponding to the subject inner areas a902, a904, and a906 are, respectively, areas a903, a905, and a907 excluding a902, a904, and a906.

The area-of-interest detection unit 116 then calculates the degree of visual saliency as in FIG. 16B based on the difference in feature amount between the subject inner area and the subject outer area. The value of the degree of visual saliency of an area a1000 is large because the difference in feature amount between the subject inner area and the subject outer area is large. The value of the degree of visual saliency of an area a1002 is moderate because the difference in feature amount between the subject inner area and the subject outer area is moderate. The values of the degrees of visual saliency of an area a1001 and an area a1003 are small because the differences in feature amount between the subject inner areas and the subject outer areas are small.

Because the degree of visual saliency calculated in this manner involves a visually conspicuous area of interest, the degree of visual saliency is used for priority setting for various processes. Examples of such processes include performing the AF control preferentially on this area of interest.

For example, in the case where multiple faces are present as in FIG. 16A, the system control unit 50 performs the AF control based on the information of phase differences calculated for the AF control and the information of an area of interest detected by the area-of-interest detection unit 116, so that a face corresponding to the area of interest is preferentially in focus. Specifically, in the examples of FIGS. 16A and 16B, the AF control is performed with priority given so that among four faces, a face on the left with a large degree of visual saliency is in focus. By performing the AF control preferentially on the area of interest in this manner, it is possible to cause the attention subject (area of interest) to be in focus without blurring the attention subject (area of interest).

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-202121, filed Sep. 30, 2014, which is hereby incorporated by reference herein in its entirety.

What is claimed is:

1. An image processing apparatus comprising:
at least one processor;
a memory that includes instructions for the at least one processor to, by being executed by the at least one processor;
set a search area based on spatial information of a subject, the spatial information being information of an area in which the subject in an image is predicted to be present;
set a first area inside the search area but not outside the search area;
set a second area outside the first area;
calculate a first feature amount of the first area;
calculate a second feature amount of the second area, the second feature amount being a feature amount of the same type as the first feature amount; and
calculate a degree of visual saliency of the subject in the first area based on a difference between the first feature amount and the second feature amount,
wherein in a case that a plurality of search areas are set, the first area and the second area are set and the degree of visual saliency is calculated in each of the search areas, and a processing target area is determined from the first areas of the plurality of search areas based on the calculated degree of visual saliency.

2. The image processing apparatus according to claim 1, wherein the spatial information includes at least one of a position and a size of the subject in the image.

3. The image processing apparatus according to claim 2, wherein a size of the first area is set based on the size of the subject contained in the spatial information.

4. The image processing apparatus according to claim 2, wherein a position of the first area is set based on the position of the subject contained in the spatial information.

5. The image processing apparatus according to claim 1, wherein a plurality of first areas are set in the search area.

6. The image processing apparatus according to claim 1, wherein the memory includes an instruction for the at least one processor to, by being executed by the at least one processor:
calculate information of a focused area,
wherein the spatial information of the subject is calculated based on the information of the focused area.

7. The image processing apparatus according to claim 6, wherein the information of the focused area is calculated based on information indicating whether or not the area is in focus during a focusing operation.

8. The image processing apparatus according to claim 1, wherein the memory includes an instruction for the at least one processor to, by being executed by the at least one processor:
calculate information of an area in which a moving body is present,
wherein the spatial information of the subject is calculated based on the information of the area in which the moving body is present.

9. The image processing apparatus according to claim 8, wherein the information of the area in which the moving body is present is calculated based on an absolute difference between a plurality of images.

10. The image processing apparatus according to claim 1, wherein the memory includes an instruction for the at least one processor to, by being executed by the at least one processor:
calculate information of an area in which a subject is present,
wherein spatial information of the subject is calculated based on the information of the area in which the subject is present.

11. The image processing apparatus according to claim 10,
wherein the information of the area in which the subject is present is calculated in accordance with at least one of face detection information and human body detection information.

12. The image processing apparatus according to claim 1, wherein degree of visual saliency of only an area whose area measurement is larger than a predetermined value is calculated.

13. The image processing apparatus according to claim 1, wherein the first and second feature amounts include at least one of brightness, color, edge intensity, a brightness histogram, a color histogram, and an edge intensity histogram.

14. The image processing apparatus according to claim 1, further comprising a lens group including a focus lens.

15. The image processing apparatus according to claim 14,
wherein the memory includes an instruction for the at least one processor to, by being executed by the at least one processor:
perform an autofocus control using the focus lens so that the processing target area become in-focus state.

16. The image processing apparatus according to claim 1, wherein the second area is an area whose center is the same as that of the first area and is a remaining area of an area that is larger than the first area excluding the first area.

17. An image processing method comprising:
setting a search area based on spatial information of a subject, the spatial information being information of an area in which a subject in an image is predicted to be present;
setting a first area inside the search area but not outside the search area;
setting a second area outside the first area;
calculating a first feature amount of the first area;
calculating a second feature amount of the second area, the second feature amount being a feature amount of the same type as the first feature amount; and
calculating a degree of visual saliency of the subject in the first area based on a difference between the first feature amount and the second feature amount,
wherein in a case that a plurality of search areas are set, the first area and the second area are set and the degree of visual saliency is calculated in each of the search areas, and a processing target area is determined from the first areas of the plurality of search areas based on the calculated degree of visual saliency.

18. A non-transitory computer readable storage medium storing a computer-executable program for executing a method for controlling an image processing apparatus using the computer,
the method comprising:
setting a search area based on spatial information of a subject, the spatial information being information of an area in which a subject in an image is predicted to be present;
setting a first area inside the search area but not outside the search area;
setting a second area outside the first area;
calculating a first feature amount of the first area;
calculating a second feature amount of the second area, the second feature amount being a feature amount of the same type as the first feature amount; and
calculating a degree of visual saliency of the subject in the first area based on a difference between the first feature amount and the second feature amount,
wherein in a case that a plurality of search areas are set, the first area and the second area are set and the degree of visual saliency is calculated in each of the search areas, and a processing target area is determined from the first areas of the plurality of search areas based on the calculated degree of visual saliency.

* * * * *